UNITED STATES PATENT OFFICE.

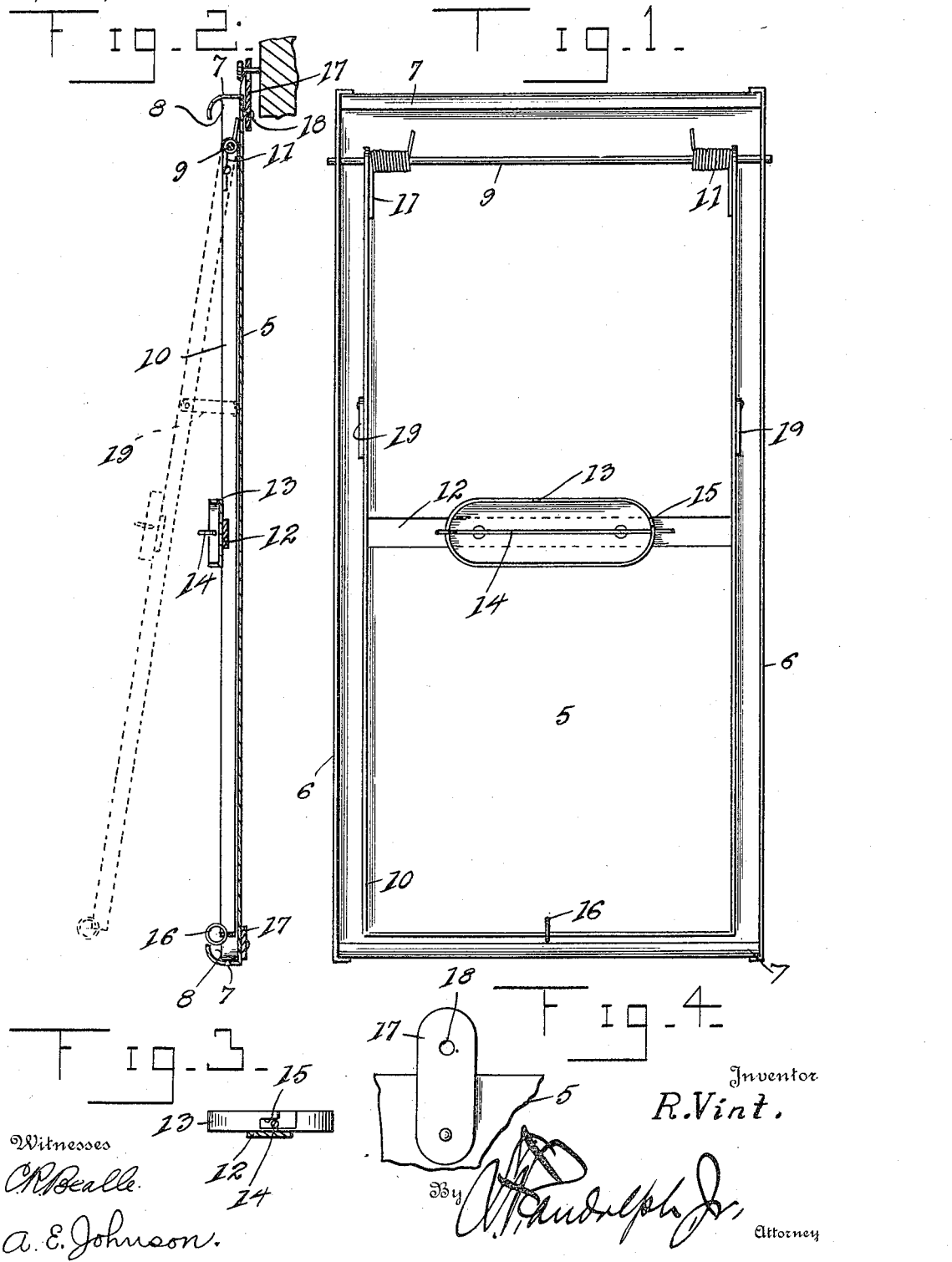

ROBERT VINT, OF STOCKTON, CALIFORNIA.

FLY-PAPER HOLDER.

1,175,846.  Specification of Letters Patent.  Patented Mar. 14, 1916.

Application filed September 17, 1913. Serial No. 790,317.

*To all whom it may concern:*

Be it known that I, ROBERT VINT, a citizen of the United States, residing at Stockton, in the county of San Joaquin and State of California, have invented certain new and useful Improvements in Fly-Paper Holders; and I do hereby declare the following to be a full, clear, and exact description of the invention, such as will enable others skilled in the art to which it appertains to make and use the same.

This invention comprehends improvements in fly paper holders and has for its primary object the provision of a device of this nature, which is extremely simple in construction, cheap to manufacture, strong and durable.

Another and more specific object of the invention is to provide a fly paper holder including a base in the form of a pan in which a sheet of paper is placed, a spring pressed clamping frame for holding the paper within the pan and a bait receptacle in which any substance, which will attract flies, and other insects, may be placed.

The invention also aims to generally improve devices of this nature to render them more useful, practical and commercially desirable.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which—

Figure 1 is a front elevation of my improved fly paper holder. Fig. 2 is a longitudinal sectional view, showing the holder attached to a supporting member, and showing by dotted lines the position of the frame when swung away from the pan, Fig. 3 is a detail view showing one end of the bait receptacle, and Fig. 4 is a fragmentary detail view of one of the attaching plates.

In the preferred embodiment of my invention I provide a rectangular tray or pan having a bottom 5, side walls 6 and end walls 7. The end walls are curved inwardly, as clearly shown in Fig. 2, to form troughs 8, for the purpose to be hereinafter explained.

A pivot rod 9 is supported in the side walls 6 adjacent one end of the tray or pan and has attached thereto a U-shaped clamping frame 10, which is for the purpose of engaging a sheet of fly paper adjacent the edges thereof and holding the sheet against the bottom of the pan. The frame 10 is constructed of a comparatively narrow strip of sheet metal bent on transverse lines adjacent its center to provide a non-resilient and strong clamping frame. The extremities of the frame 10 are apertured and pivotally mounted upon the rod 9, and springs 11 are provided for forcing the frame toward the pan. These springs encircle the rod 9 and bear at one end the bottom of the pan and are fixed at the other end of the arms of the frame.

A brace bar 12 extends transversely of the frame 10 and is fixed at its ends to the arms of the frame centrally of their ends. A bait holding receptacle 13 is rigidly secured to the top of the brace bar and carries pivotally attached to one end thereof a bait holding rod 14, the free end of which may be locked in the bayonet slot 15 formed in the opposite end of the receptacle.

In order that the frame may be easily swung away from the pan when it is desired to place a sheet of fly paper therein, or to remove a sheet therefrom, I provide a ring 16 which is secured to the central portion of the frame, and which serves as a handle. The device may be suspended from a nail or hook by means of the attaching plates 17 which are pivoted to the bottom 5 on the exterior side thereof and which are formed with openings 18 through which a fastener may extend. When the holder is placed on a table or other horizontal support, these attaching plates may be folded under the pan out of sight.

Often the mucilage upon a sheet of fly paper becomes very soft and runs, when the paper is held in a vertical plane, and it is for catching this mucilage and preventing it dropping upon the floor that I provide the troughs 8. It is to be noted that should the holder be accidentally overturned, that the walls of the pan will prevent the paper coming in contact with the horizontal surface. The pivoted arms 19 carried by the frame 10 provide a means for holding the frame away from the pan so as to leave the hands free to remove or insert a sheet of fly paper.

From the foregoing description taken in connection with the accompanying drawings, it will be seen that I have provided a very simple and practical fly paper holder, which includes a bait receptacle carried by the paper clamping frame. The clamping frame permits a sheet of paper to be inserted or removed from the holder very quickly and the bait receptacle, being carried by the clamping frame, never interferes with the above mentioned operation.

While I have shown and described the preferred embodiment of my invention, it will be understood that minor changes in construction, combination and arrangement of parts may be made without departing from the scope and spirit of the invention as claimed.

Having thus described my invention, I claim:—

A fly paper holder including a pan, a rod secured through the side walls of said pan, a frame formed from a flat strip bent on transverse lines into U-shape and having its parallel ends pivotally secured to said rod, spring means normally retaining said U-shaped frame in engagement with the bottom of said pan, a brace bar connecting the central portions of the parallel members of the U-shaped frame, a bait receptacle secured to the outer face of said bar, and a bait-holding rod pivotally secured in the bait receptacle.

In testimony whereof I affix my signature in presence of two witnesses.

ROBERT VINT.

Witnesses:
W. J. HAMMAN,
C. M. HAMMAN.

Copies of this patent may be obtained for five cents each, by addressing the "Commissioner of Patents, Washington, D. C."